United States Patent [19]

Crawford

[11] 4,224,479
[45] Sep. 23, 1980

[54] METHOD OF CONTROLLING CALL TRAFFIC IN A COMMUNICATION SWITCHING SYSTEM

[75] Inventor: Kenneth E. Crawford, Columbus, Ohio

[73] Assignee: Bell Telephone Laboratories, Incorporated, Murray Hill, N.J.

[21] Appl. No.: 13,386

[22] Filed: Feb. 21, 1979

[51] Int. Cl.$^2$ .................................... H04M 15/02
[52] U.S. Cl. ........................ 179/18 DA; 179/8 A; 179/18 ES
[58] Field of Search ............ 179/8 A, 18 ES, 18 EA, 179/18 E, 18 DA, 18 D, 18 B, 18 BG, 7.1 R, 27 G, 18 FH

[56] References Cited

U.S. PATENT DOCUMENTS

| | | | |
|---|---|---|---|
| 3,796,837 | 3/1974 | Mathews | 179/18 EA |
| 3,934,095 | 1/1976 | Matthews et al. | 179/18 D |

*Primary Examiner*—Thomas W. Brown
*Attorney, Agent, or Firm*—Sherman N. Turner

[57] ABSTRACT

Call traffic in a stored program controlled telephone switching system is controlled by performing code gapping on telephone calls to a particular called customer. Code gapping is performed by limiting the rate at which successive attempts may be made to complete all or part of a call to the particular called customer which is identified by a called customer code, such as a Plain Old Telephone Service (POTS) called customer directory code. A Minimum Time (MT), such as 10 seconds, is prescribed as the MT for the POTS number. A record is made of the Last Clock Time (LCT) at which the last earlier allowed attempt was made to complete a call to the POTS number. The Present Clock Time (PCT) is noted as the time at which completion of a subsequent call to the POTS number is presently desired. The subsequent call completion attempt is denied if the MT for the POTS number has not expired since the LCT for the POTS number; but, if the MT has expired, the subsequent call completion attempt is allowed and the PCT becomes the new LCT for the POTS number.

11 Claims, 8 Drawing Figures

METHOD OF CONTROLLING CALL TRAFFIC IN A COMMUNICATION SWITCHING SYSTEM

TECHNICAL FIELD

The present invention relates to the control of call traffic in communication switching systems wherein attempts are made to complete at least parts of communication paths for calls and wherein it is desired to limit certain types of call traffic so as to reduce the tendency of such types of traffic to cause congestion of switching routes and/or of switching control means.

BACKGROUND OF THE INVENTION

Paths through communication systems are usually completed, or attempted to be completed, under the control of a called customer code which in one way or another is used to identify some ultimate destination toward which a call should be extended. Such calls may involve either (1) only one switching center if the destination for the call is terminated in or is directly served by the same switching center as the origination of the call or (2) any number of switching centers if the origination and destination are terminated in or are served by different switching centers.

Control of call traffic is necesary in order that attempts to complete calls do not cause either congestion of selected switching routes or excessive use of, and thus congestion of, the switching control means employed to select the switching routes.

One well-known method of controlling call traffic has been to limit in some way the amount of traffic allowed to be extended over a particular switching route, such as over a particular trunk group. This method has suffered the disadvantage that many types of calls toward many types of destinations have been subjected at times to degradation of service caused by calls toward relatively few types of destinations, such as an avalanche of calls at a particular time to or toward such destinations as telethons and the like. Limiting switching route access has generally taken the form either of a physical limitation based on attempting to route calls over a limited access route or of denying any access to a route for a period of time. When such a route (for example, a particular interswitching-center trunk group) becomes overloaded, or is otherwise denied, the control means of a switching center may route excess calls to some sort of announcement or intercept operator location from which is provided some explanation of the failure to complete the call. Such a procedure is unfair to a large majority of calls to which the blame for the congestion cannot be attributed.

Another well-known method of controlling call traffic has been to use what is known as code blocking. This method limits traffic which is attempted to be completed according to all or part of some called customer code. Here, some sort of selective control has been effected in that traffic to or toward destinations identified by particular called codes can be controlled. Such control has been rendered effective to block a certain percentage of calls either for a certain period of time or until a switching or control congestion situation clears up. This method has the disadvantage that all or a substantial number of the allowed calls may occur in a concentrated period of time, thus leaving the remaining time unused or wasted.

SUMMARY OF THE INVENTION

The present invention provides a call traffic controlling method which limits certain traffic without limiting other traffic and without wasting valuable control time.

The general method of the present invention limits the recurrence rate of successive attempts to complete at least parts of communication paths for a particular type of call to a maximum rate prescribed by a parameter of the particular type of call. In this manner, only those types of calls which really need some sort of traffic control are subjected to special call traffic limitation; while, other types of calls are attempted to be completed without special call traffic limitation.

In a more limited aspect, the invention provides a method of controlling call traffic by using at least part of a called customer code as the prescribing parameter. For instance, a called customer code may in whole or in part identify a particular called customer; and, that identity may or may not identify one or more particular switching center terminals assigned to the customer.

A called customer code of the well-known conventional INWATS (INward Wide Area Telephone Service) type, such as 800+NXX+ABCD, identifies a particular called line (or hunting group, or call distributor, etc.) assigned in a particular terminating switching center to the called INWATS customer. All or part of this code may be used according to the invention to limit call traffic.

A called customer code of the enhanced INWATS type, also such as 800+NXX+ABCD, identifies a particular INWATS customer exclusive of the identification of any particular terminating called line, and so forth which may be assigned in a particular terminating switching center to the INWATS customer. All or part of this code may be used according to the invention to limit call traffic.

A called customer code of the ordinary POTS (Plain Old Telephone Service) type, such as NPA+NXX+ABCD, identifies a particular terminating called line, and so forth assigned to the POTS customer, as in the case of the conventional INWATS code, in a particular terminating switching center. All or part of such a code may be used according to the invention to control call traffic.

Furthermore, a called customer code of the enhanced INWATS type may be translated for switching control purposes into a called customer code of the conventional INWATS type or of the ordinary POTS type. Either of the latter codes may be used in whole or in part according to the invention to control call traffic.

Specifically, the method of the present invention allocates to the prescribing parameter a minimum time interval between the allowable making of successive call completion attempts, ascertains at a present attempt time whether or not the minimum time has elapsed since the last earlier allowed attempt, and allows the present attempt only if at least the minimum time has elapsed.

In particular, the above specific steps of the method may be accomplished by recording the earlier clock time of the last earlier allowed attempt and by verifying whether or not the difference between the present clock time and the earlier clock time is at least equal to the minimum time. It is to be understood here that "clock time" means the actual time of day or night.

BRIEF DESCRIPTION OF THE DRAWINGS

The drawings consist of five sheets showing FIGS. 1 through 8 generally described as follows.

DETAILED DESCRIPTION

Figure 1:
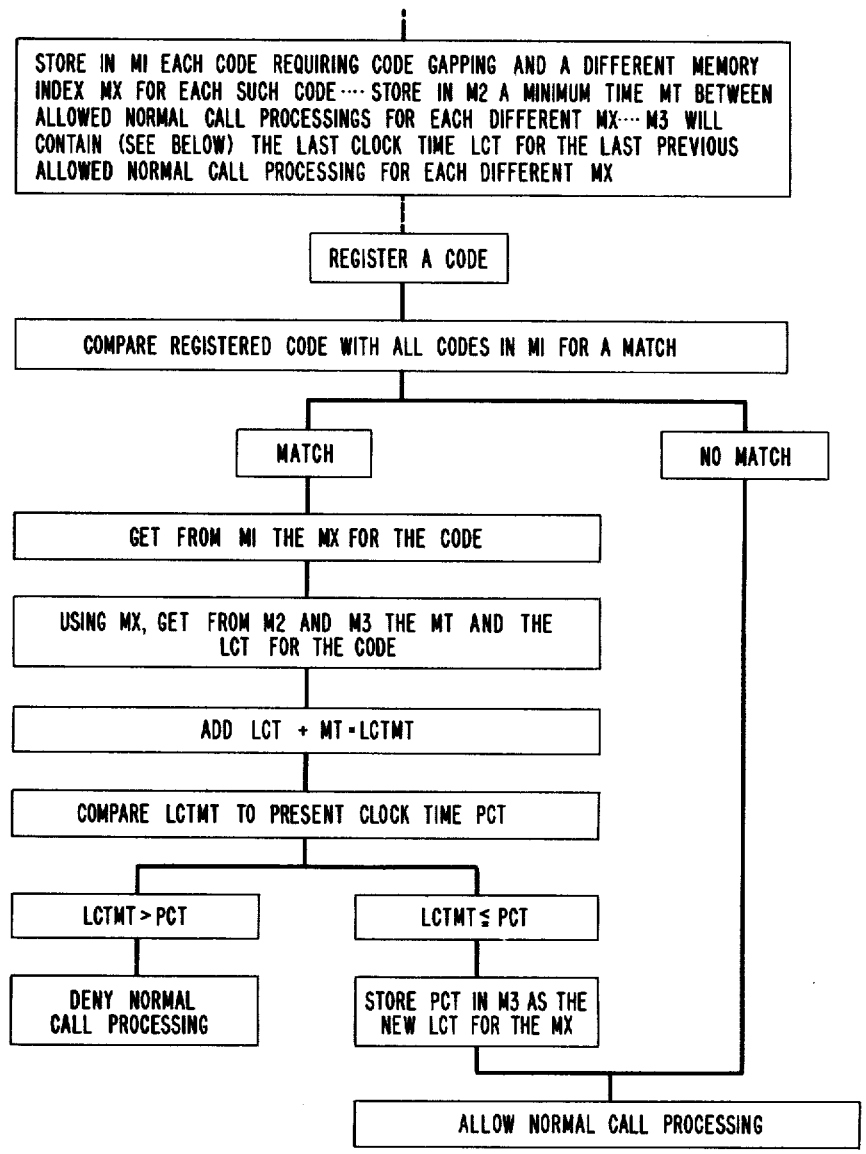
FIG. 1 shows in flow chart form the method steps of the invention as they might be used to control traffic for a particular registered code.

The detailed description is arranged according to the following sequence of subheadings: General, CCIS, No. 4A/CCIS, No. 4ESS, Ordinary DDD Call, Conventional INWATS Call, Enhanced INWATS Call, Code Gapping, Code Blocking, Code Blocking and Code Gapping, Data Base-Code Blocking, Data Base-Code Gapping, and Data Base-Code Control. General The method of the invention may find use in any one of various types of communication switching systems and in any one of various manners within a particular system. The invention may, for example, find use in a stored program controlled processor type of system such as is referred to herein as an example of an environment for the invention. Also by way of example, a call to a particular called customer is used herein to illustrate one manner in which the invention might be used where a called customer code is used as the prescribing parameter for controlling traffic for the call.

It is considered helpful to an understanding of the utility of the invention, as described in detail hereinafter, to set forth in the next six subheadings a brief review of some of the types of codes and other technicalities involved in modern switching systems.

CCIS

Common Channel Interoffice Signaling (CCIS) provides direct communication between processors in stored program controlled telephone switching systems to handle signaling and network control information independently of the paths used for communication between customers. A Bell System version of CCIS is disclosed in the *Bell System Technical Journal*, Volume 57, Number 2, of February 1978 and in U.S. Pat. No. 3,624,613 to W. B. Smith and J. B. Synnott, III of Nov. 30, 1971 and in an article beginning at page 53 in the *Bell Laboratories Record*, Volume 57, Number 2 of February 1979.

No. 4A/CCIS

The Bell System No. 4A Toll Crossbar Telephone System was updated years ago to what has become known as the No. 4AETS (Electronic Translator System) embodying stored program controlled processing of code translation for call routing. The No. 4AETS is disclosed in the *Bell System Technical Journal*, Volume 57, Number 2, of February 1978 and in U.S. Pat. No. 3,564,149 to C. J. Funk, P. R. Miller, and P. J. Moylan of Feb. 16, 1971.

Also in the *Bell System Technical Journal*, Volume 57, Number 2, of February 1978, is disclosed the manner in which the No. 4ETS System has been modified to work in a CCIS system. Such a modified system is known as the No. 4A/CCIS, major parts of which are shown in block diagram form in FIG. 2. No. 4A/CCIS is also disclosed in an article beginning at page 132 in the *Bell Laboratories Record*, Volume 56, Number 5, of May 1978.

No. 4ESS

The Bell System No. 4ESS telephone switching system is described in the *Bell System Technical Journal*, Volume 56, Number 7, of September 1977. The No. 4ESS is an all electronic switching system originally designed to work in a CCIS system. The No. 4ESS involves stored program controlled processing of calls and is shown in general block diagram form in FIG. 3.

The above-cited U.S. patents and articles from the *Bell System Technical Journal* and the *Bell Laboratories Record* are incorporated herein by reference.

Ordinary DDD Call

Ordinary Direct Distance Dialing (DDD) calls originate in an Originating Local Office (OLO) by the use of a Plain Old Telephone Service (POTS) called number of the general form NPA+NXX+ABCD where NPA identifies the called Numbering Plan Area, NXX (N may be usually any of 2 to 9 and X may be usually any of 0 to 9) identifies the called Terminating Local Office (TLO), and ABCD (for example, 0000 to 9999 in a ten thousand line office) usually represents the called line terminal in the TLO.

In the usual case, the OLO sends NPA+NXX+ABCD to a Toll Office (TO) where six-digit translation of NPA+NXX provides a routing for the call. The TO routes the call either (1) directly to a TLO by using NXX+ABCD or (2) toward a TLO through another office by using NPA+NXX+ABCD.

Conventional INWATS Call

In the conventional type of INward Wide Area Telephone Service (INWATS), a calling party in an OLO originates a called code of the form 800+NXX+ABCD. The code 800+NXX+ABCD is, for example, an advertised called number of an INWATS customer who pays for calls to that number provided that the calls come from a geographical rate band (that is, a certain geographical area) subscribed to by the INWATS customer. 800 identifies the call as an originating INWATS type of call. NXX corresponds to (but not necessarily the same as) the NPA of the INWATS customer's TLO (NX2 is usually reserved for intrastate INWATS). The ABCD digits identify a particular TLO terminal assigned to the INWATS customer.

The first nine digits 800+NXX+ABC constitute a code associated with a particular rate band. In the latter regard, the association is known only at a Terminating Screening Office (TSO) and includes a limitation to the effect that all ten INWATS customers having the same first nine digits (that is, the D digit can vary usually from 0 to 9) must subscribe to the same rate band.

The OLO sends 800+NXX+ABCD to a TO which translates 800+NXX to derive the proper call routing to or toward the proper Originating Screening Office (OSO) which must have six-digit translation capability. If the incoming trunk group (that is, the one used for the call) at the OSO serves only one WATS State (that is, a geographical area designated as a WATS Rate State), the TO sends 800+NXX+ABCD to the OSO since the OSO can ascertain the WATS State of origin by noting the incoming trunk class. If the incoming trunk group at the OSO serves more than one WATS State, the TO converts the 800 to an OOY and sends OOY+NXX+ABCD to the OSO where Y (which can be usually any of 6 through 8) identifies to the OSO the WATS State of call origin.

The OSO ascertains from 800 (or OOY)+NXX the NPA of the desired TLO, deletes the 800 (or OOY)+NXX, and routes the call to or toward the proper TSO. Direct routing to the TSO is by use of the code 1YZ+ABCD. Routing to the TSO through an intermediate office is by the use of the code 08Z+NXX+ABCD. In these latter codes, Y is an abbreviation for the NXX with respect to the TSO which may usually serve up to five different NXX codes and Z identifies the originating rate band with respect to the WATS State of the INWATS customer. If the OSO happens also to be the proper TSO, the call is looped around the OSO and back into the OSO (that is, acting as the TSO) using the same OSO-to-TSO direct routing code 1YZ+ABCD as above. In any case, the TSO eventually receives a direct route coding of the form 1YZ+ABCD.

The TSO translates 1YZ+ABCD to ascertain whether or not the call is to be allowed (that is, comes from a rate band subscribed to by the INWATS customer) and to ascertain the location of and the routing to the proper TLO if the call is to be allowed. The TSO deletes the 1YZ and sends OXX (or a single directing digit)+ABCD to or toward the TLO where billing will take place for the call.

Enhanced INWATS Call

This type of INWATS (referred to herein as CCIS INWATS) assumes a stored program controlled switching network connected into a CCIS system including CCIS Signal Transfer Points (STP) and INWAYS Data Bases (DB). In this arrangement, an INWATS customer typically has only one INWATS code 800+NXX+ABCD; however, a call to such a number is to be capable of being routed to any of a number of different called line terminations in possibly different TLOs. The 800+NXX+ABCD identifies by itself a particular INWATS customer but does not identify by itself any particular terminal in any particular TLO.

A CCIS INWATS call using the code format 800 (or OOY)+NXX+ABCD is routed to a TO equipped for CCIS (for example, a No. 4ESS or a No. 4A/CCIS). The TO sends a CCIS inquiry message to an STP which will route the message to the proper DB. The DB sends back, to the TO through the STP, a CCIS message comprising a code which the TO can use to complete the call on a conventional or ordinary basis to a particular TLO terminal assigned to the INWATS customer. Certain translating aspects regarding such a DB situation are disclosed and claimed in U.S. Pat. No. 4,191,860 to R. P. Weber of Mar. 4, 1980 for "Data Base Communication Call Processing Method."

The CCIS message sent to the DB includes an INWATS code 800 (or OOY)+NXX+ABCD, a code identifying the area of call origin, the CCIS return code of the TO (to identify the TO to which a reply is to be sent), and a call identifier to identify the particular call to which a particular CCIS message pertains.

The DB is kept informed from local CCIS-equipped offices of the busy-idle status of particular INWATS customer terminals; and, the DB contains all other necessary INWATS screening information.

The reply from the DB is a CCIS message providing the return address of the TO, the call identifier, and the proper message itself. The message will usually comprise an unlisted POTS number; however, the message may comprise either (1) a "busy" or "closed" indication, or (2) an "out-of-band" indication, or (3) a "vacant line" indication depending upon which situation may prevail. The TO then takes appropriate routing action either to attempt to route the call as a normal DDD call routed to the POTS number or to attempt to route the call to an appropriate announcement for either (1) or (2) or (3) above.

In some situations there may be no active DB for the INWATS code. In such cases, the call will receive routing processing by the TO as in the case of conventional INWATS.

If a DB is active for the INWATS code but does not contain a corresponding POTS number, the DB may send a reply message comprising the same INWATS code that was sent to the DB as an inquiry. In the latter situation, the TO must attempt to route the call as in the case of conventional INWATS.

The DB is capable of providing an additional CCIS message of a Network Management (NM) type. Such an NM message may instruct a TO to perform code control on a particular INWATS code, either 800 (or OOY)+NXX (that is, any INWATS customer in the NXX area) or 800 (or OOY)+NXX+ABCD (that is, a particular INWATS customer), whereupon the TO performs code control on such calls. Code control may comprise, for example, allowing only one call completion attempt every three seconds for a fixed period of five minutes according to the present invention. Code control at the TO ceases at the end of the fixed period of time but may be refreshed (that is, rendered effective again) by another suitable NM message from the DB. Each such refreshment will cause an additional fixed period of code control time.

Code Gapping

In any switching system, numerous switching functions usually take place prior to and subsequent to whatever processing must be done in order to ascertain the proper routing for a call. As an example of how the present invention may be employed in a particular way, the present disclosure assumes as an example that (1) the particular type of call with respect to which traffic control is to be effected is a call to a particular called customer, that (2) among the parameters of the call is a called customer code, and that (3) the called customer code is the parameter which prescribes the maximum recurrence rate of successive attempts to complete at least a part of a communication path for the call. This particular use of the invention will be referred to in the description to follow as code gapping.

FIG. 1 shows in detail the specific steps to be followed for performing code gapping on a code which is registered during the processing of a call. FIG. 1 assumes a stored program controlled processor system, such as the No. 4A/CCIS of FIG. 2 or such as the No. 4ESS of FIG. 3. Also, it is assumed by way of example that the called customer code is the POTS number of a ordinary DDD call. It will be understood, of course, that any other code in whole or in part may be used to implement this specific example of the invention.

At some appropriate time during the processing of a call to a POTS number, a point is reached, during the sequence of stored program instructions, when it is necessary to ascertain the proper routing for the call. Code gapping is used to decide if the call is to be allowed normal processing or if the call is to be denied normal processing. Such code gapping can be injected into the sequence of call processing instructions at any desired point by inserting into the stored program instructions a suitable set of instructions to implement the code gapping sequence of steps. In the details to be discussed with respect to FIGS. 4 through 8, it is assumed that code gapping occurs during the time normally reserved for ascertaining the proper routing for a call. It will be obvious that code gapping may be used at any other desired time.

In FIG. 1, as indicated, prior to the time when a registered code is available, three memory storage areas may be assumed to have been prepared as follows: memory M1 has been prepared either manually or automatically so as to contain each code requiring code gapping, memory M1 similarly has been prepared to contain a different Memory Index MX corresponding to each different code in memory M1; memory M2 similarly will contain a Minimum Time interval MT between allowed normal call processings for each Memory Index MX; the MT for any MX may be any desired time interval such as ten seconds; memory M3 will contain (as will be realized from subsequent description) the Last Clock Time LCT for the last earlier allowed normal call processing for each different MX; it may be assumed, as an initial starting point for memory M3, that the initialization clock time may be placed in M3 as the LCT for each MX so that the first call for each MX will be allowed normal processing on the assumption that the MT will have expired by the time that code gapping is checked for any call processed after initialization.

Figure 2:
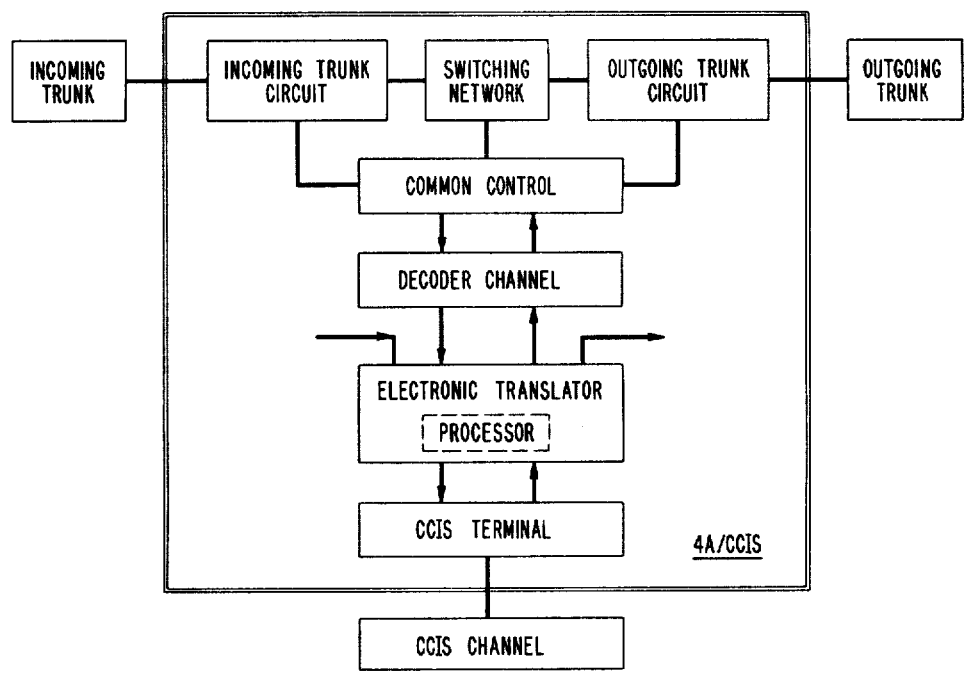
FIGS. 2 and 3 are block diagrams of parts of two well-known Bell System switching centers wherein the invention could be employed.

In the No. 4A/CCIS system of FIG. 2, a called POTS code may become registered in one of a number of known ways: for example, either on a decoder channel bid from common control or by way of a CCIS message incoming via the CCIS. terminal. In either case, the POTS code will become registered in known fashion in the electronic translator along with a request for routing instructions.

Figure 3:
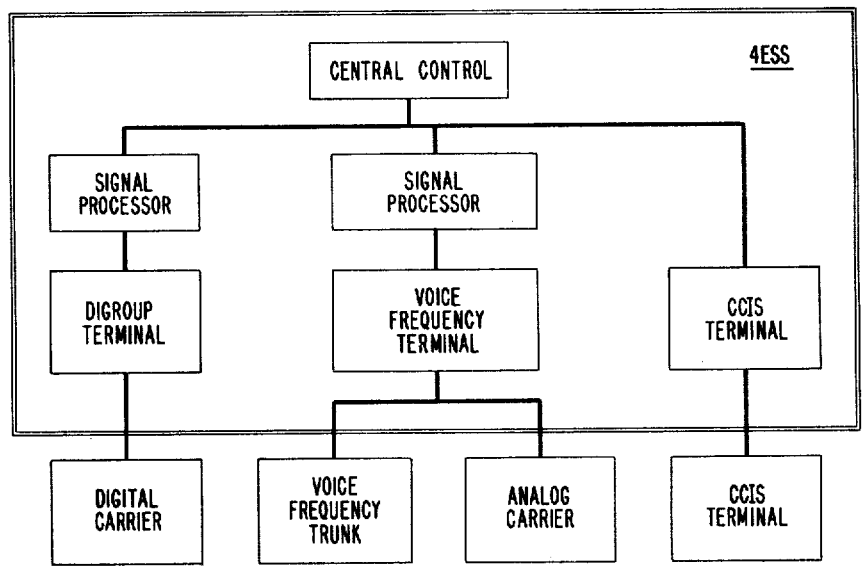

In the No. 4ESS system of FIG. 3, a called POTS code may become registered in known fashion in a signal processor, for example, as part of a CCIS message incoming via the CCIS terminal.

Using the above assumptions as a starting point, in FIG. 1 when a registered code is to be checked for code gapping, the registered code is compared with all codes stored in M1. If no match occurs, the code is allowed to have normal call processing. If a match occurs, the Memory Index MX for the matching code is retrieved from M1 and is used as the indexing means into memories M2 and M3 to retrieve from the latter the corresponding respective Minimum Time MT and Last Clock Time LCT. LCT and MT are added together and the sum is compared to the Preset Clock Time PCT (that is, the present clock time at the present moment). If the sum of LCT+MT (that is, LCTMT) is greater than the PCT, the indication is that the MT has not expired since the last earlier allowed normal call processing; and, the overall result will be to deny normal call processing for the registered code. If, on the other hand, the sum LCTMT is equal to or less than the PCT, the indication is that the MT has expired since the last earlier allowed normal call processing; and, the overall results will be to store PCT in M3 as the new LCT for the particular MX and to allow normal call processing for the code.

In subsequent description of FIGS. 4 through 8, the above series of steps has been abbreviated as will be apparent.

Code Blocking

Figure 4:
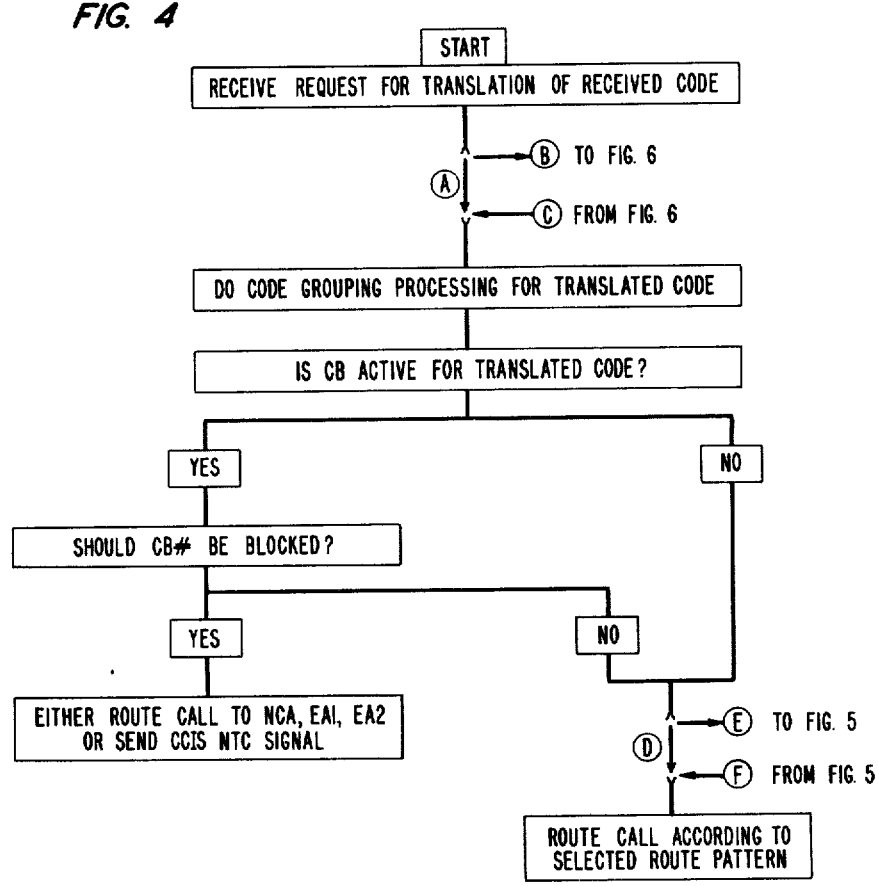
FIG. 4 is a flow chart illustrating general method steps known in the prior art for deriving a routing pattern for a call.

FIG. 4 by itself, using the flow charting via paths A and D (that is, not using any of paths B, C, E, and F to and from FIGS. 5 and 6), does not involve either code gapping or code control but does involve prior well-known code blocking technique. In this situation, a request is received for route translation for a received code which, of course, will also become registered somewhere.

Path A is assumed, resulting in the same code being registered as the "translated" code with respect to which code grouping processing is to be done. Subsequent description will show how, in some instances, the "translated" code may be different from the received code. In any case, the "translated" code will also become registered somewhere.

In FIG. 4, code grouping processing is done in order to group all codes which are to receive similar routing treatment. As a result of this process, a routing pattern index is typically derived (that is, selected) for later use during call routing processing where an attempt will be made to route the call according to the derived or selected route pattern.

Before call routing processing is done, a check is made to ascertain whether or not code blocking (CB) is active for the translated code. CB is usually manually inserted and manually removed as a traffic control measure. CB allows a certain percentage of traffic to receive normal call processing where the choice of calls to be allowed may be determined by a random number technique so that over a given number of calls a statistical percentage (e.g., 25%) is allowed (that is, 75% is blocked). As an example, a software clock (for example, an eight-bit register) may be incremented every five milliseconds (ms). The clock starts at zero, runs to 300 ms (30 increments), and then recycles to zero. Typically, eight CB percentages may be used starting at 12½% and increasing in 12½% steps to 100%: these percentages correspond to eight CB numbers (CB#) of 7, 6, 5, 4, 3, 2, 1, and 0. The low order three bits of the clock register may be used to represent CB#s of 0 to 7. The following indicates the percentage of call blocking corresponding to each CB#: CB#0=100%; CB#1=87½%; CB#2=75%; CB#3=62½%; CB#4=50%; CB#5=37½%; CB#6=25%; and CB#7=12½%. A section of memory will contain each code for which CB is active. The registered code is compared to each code in the memory to see if CB is active for the code and to ascertain its CB# if the code is active.

If the code is found not to have a CB# assigned thereto in the memory, CB for the code is not active and path D in FIG. 4 is followed, as above assumed, to result in the routing of the call according to the pertinent selected route pattern; that is, an attempt is allowed to be made to complete the call.

If the code is found to have a CB# assigned thereto in the memory, the assigned CB# will be retrieved from the memory and compared to the low order three bits of the clock. If the three low order bits of the clock define a CB# equal to or greater than the assigned CB#, the CB# should be blocked. That is, a call involving the code corresponding to the assigned CB# should not receive normal routing. For example, if the CB# is zero for 100% blocking, the clock will always have its low order three bits defining a number equal to or greater than zero, thus to call for 100% blocking. Likewise, if the CB# is 4 for 50% blocking, the clock will have its low order three bits defining a number equal to or greater than 4 half of the time to call for 50% blocking. The other CB# percentages of blocking follow the same pattern.

If the low order three bits of the clock define a number less than the CB# for the registered code, the call should not be blocked (that is, should receive an attempt at normal routing).

If the low order three bits of the clock define a number equal to or greater than the CB# for the registered code, the call should be blocked (that is, should not receive an attempt at normal routing).

In FIG. 4, allowing an attempt to route the call normally follows path D, as above assumed, so that the call is attempted to be routed according to the selected route pattern.

In FIG. 4, if an attempt to normally route the call is denied, the call is processed so that either (1) the call is routed to an announcement such as one of NCA and EA1 or EA2 or (2) a CCIS signal of the NTC variety is sent toward the origination of the call over CCIS facilitates.

NCA means No Circuit Announcement and is used here to signify the routing of a call to some sort of announcement trunk or machine which provides a prerecorded message to the effect that the call cannot be completed due to unavailability of necessary circuits.

EA1 and EA2 are Emergency Announcements which are customized by local telephone people and are used here to signify the routing of a call to some sort of announcement trunk or machine which provides a prerecorded (or perhaps live) message to the effect that the call cannot be completed due to some stated emergency.

NTC means National Trunk Congestion. Such a CCIS signal is sent toward the origination of the call so that a No Circuit Announcement may be sent to the call originator from a point as close to the latter as possible.

Code Blocking and Code Gapping

Figure 5:
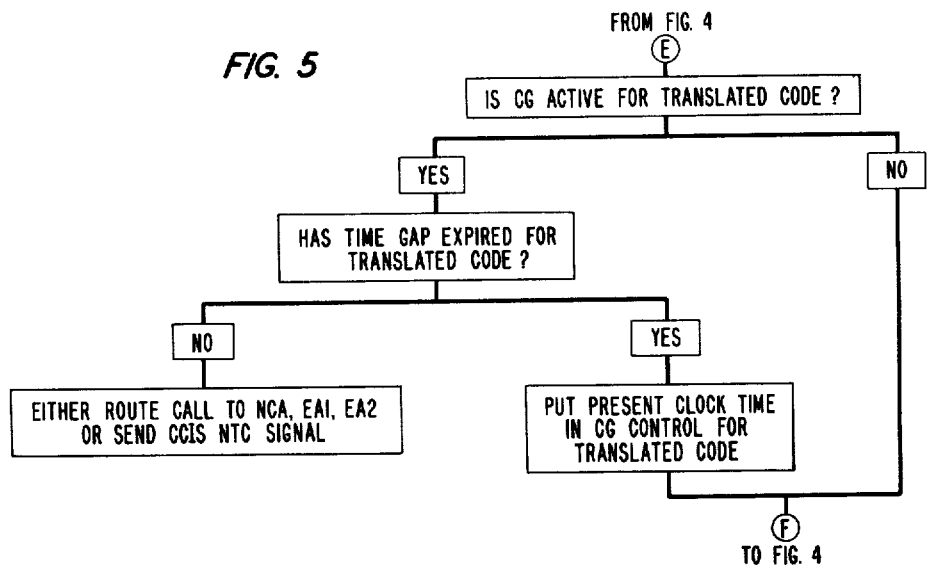
FIG. 5 shows a way in which the invention could be embodied in FIG. 4 by using paths E and F in FIGS. 4 and 5 in lieu of path D in FIG. 4.

The flow chart of FIG. 5 may be inserted into the flow chart of FIG. 4 at paths E and F (in lieu of path D) in FIG. 4 to add code gapping (CG) according to the present invention as described in detail above with regard to FIG. 1. Here, if CG is not active for the translated code, an attempt is allowed to route the call in the normal manner according to the derived or selected route pattern. On the other hand, if CG is active for the translated code, the details of FIG. 1 are followed to perform CG for the call.

Data Base-Code Blocking

Figure 6:
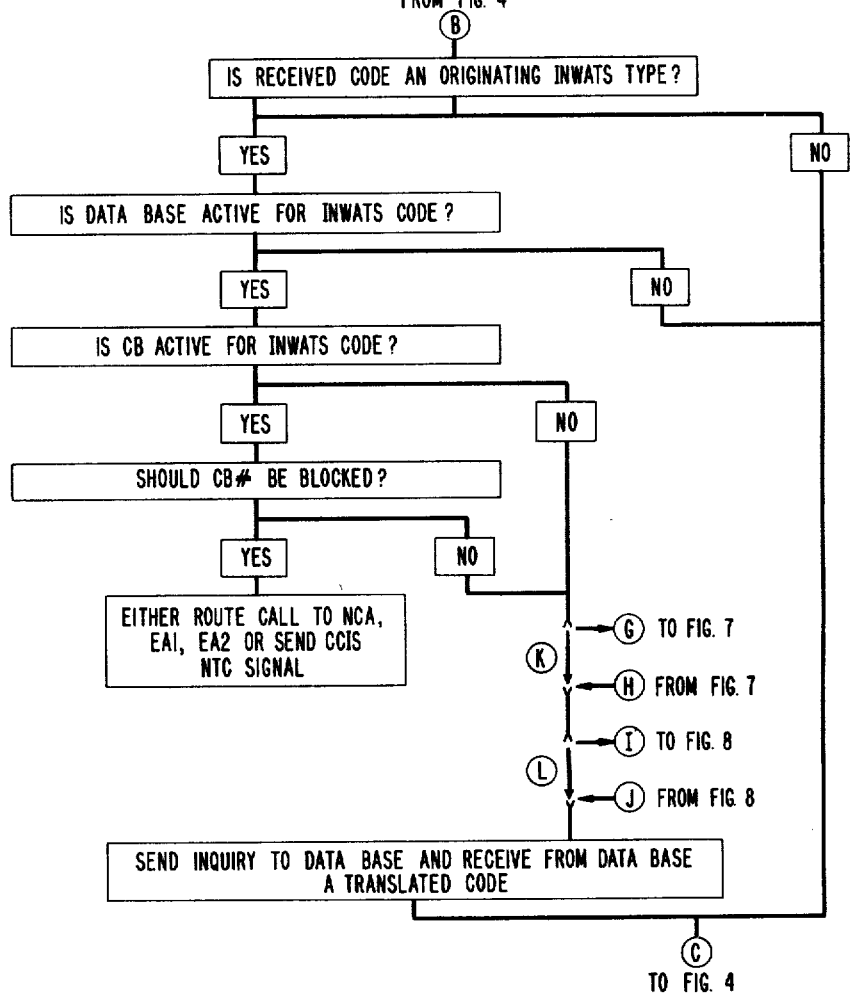
FIG. 6 shows a way in which the use of a remote INWATS Data Base could be included in FIG. 4 by using paths B and C in FIGS. 4 and 6 in lieu of path A in FIG. 4; and, FIGS. 7 and 8 show how the invention could be embodied in FIG. 6 by using paths G and H in FIGS. 6 and 7 in lieu of path K in FIG. 6 and by using paths I and J in FIGS. 6 and 8 in lieu of path L in FIG. 6.

The flow chart of FIG. 6 may be inserted into the flow chart of FIG. 4 at paths B and C (in lieu of path A) in FIG. 4 to handle possible INWATS calls. In FIG. 6, if paths K and L are used (that is, not using any of paths G, H, I, and J to and from FIGS. 7 and 8), then only code blocking is used regarding INWATS codes. The uses of FIGS. 7 and 8 are described hereafter.

The received code is checked to see if it is of the originating INWATS type. If the received code is an INWATS code, a check is made to see if a Data Base (DB) is active for the received INWATS code. If a DB is active, a check is made to see if CB is active for the received INWATS code. If CB is active, a check is made to see if the call to the received INWATS code should be blocked.

In the above steps of FIG. 6, if either the received code is not an INWATS code or there is no DB active for an INWATS code, then the flow chart returns to FIG. 4 at path C with results previously described where the translated code is the same as the received code.

Figure 7:
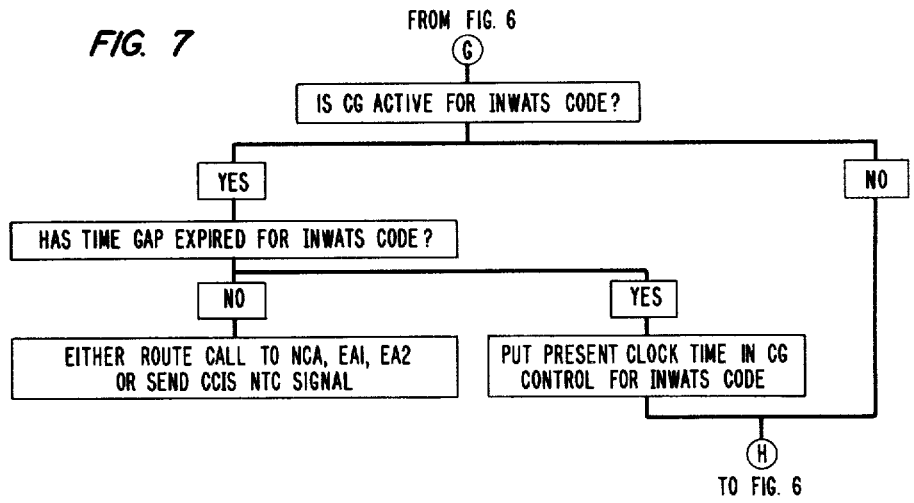
Figure 8:
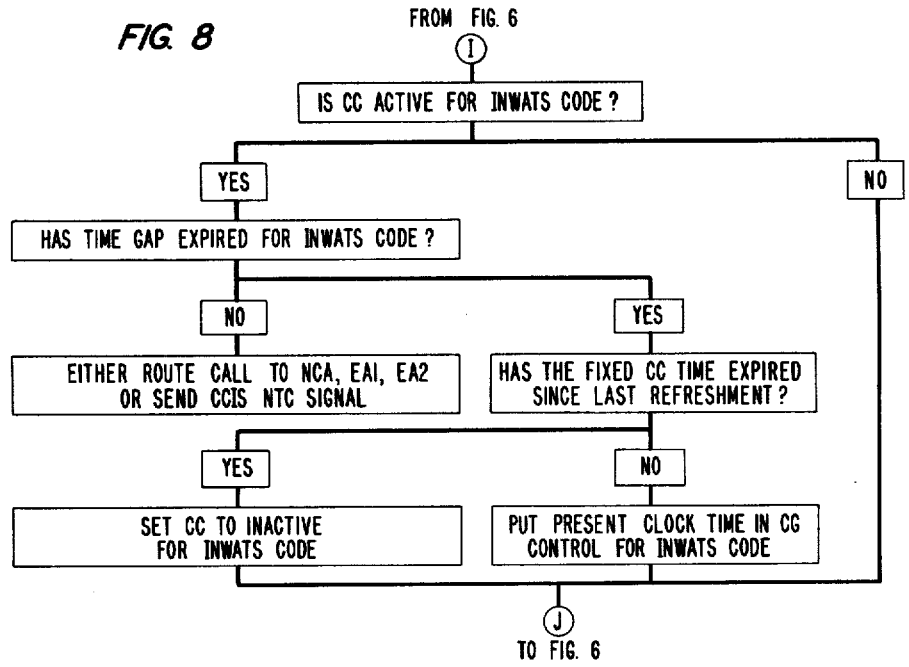

In the above steps of FIG. 6, if a CB check shows that the call for an INWATS code having an active DB is not to be blocked, and assuming that paths K and L are used (that is, FIGS. 7 and 8 are not used), then an inquiry message is sent to the DB for instructions as to what called code is used for code grouping processing, and so forth in FIG. 4. As previously described, the DB will send a reply message providing a "translated" code, which may be the same as or different from the original received INWATS code of FIG. 6. Upon the receipt of the "translated" code in FIG. 6, the flow chart returns to FIG. 4 at path C with results previously described where the translated code may be the same as or different from the received code.

In the above steps of FIG. 6, if a received INWATS code has an active DB and if a CB check shows that the call for the INWATS code is to be blocked, either the call is routed to one of NCA and EA1 and EA2 or an NTC CCIS signal is sent, all as described in connection with FIG. 4, except, of course, that the CB is performed with respect to the originally received INWATS code.

Data Base-Code Gapping

In FIG. 6 if the code gapping (CG) is to be performed on an INWATS code having an active DB where either CB is not active or the call should not be blocked where CB is active, the flow chart of FIG. 7 may be entered from FIG. 6 by way of path G (in lieu of path K) in FIG. 6 in order to do CG on the INWATS code. In FIG. 7, if either CG is not active for the INWATS code or the time gap has expired for the INWATS code (with the present clock time PTC being used to update the CG control for the INWATS code), then the flow chart returns to FIG. 6 at path H for further processing steps.

Data Base-Code Control

In FIG. 6, if code control (CC) is to be performed on an INWATS code having an active DB where either CB is not active or the call should not be blocked where CB is active, the flow chart of FIG. 8 may be entered from FIG. 6 by way of path I (in lieu of path L) in FIG. 6 in order to do CC on the INWATS code; and, it will be obvious that FIG. 8 may be used regardless of whether or not FIG. 7 is used, and vice versa.

In FIG. 8, the INWATS code may be checked against a memory register wherein is registered an indication as to whether or not CC is active for a particular code. Code control (CC) has been discussed above under the section "Enhanced INWATS Call" and may be considered here by way of example to comprise (that is, when CC is active for a particular code) allowing only one call every three seconds for a fixed period (which can be refreshed) of five minutes. If CC is not active for the INWATS code, the flow chart of FIG. 8 returns to FIGS. 6 at path J.

If CC is active for the INWATS code, code gapping (CG) is performed according to FIG. 1 to the point of ascertaining whether or not the gap time of three seconds has expired since the last earlier allowed attempt at normal call processing for the code. If the gap time has not expired, the call is denied any attempt at normal call processing; and, either the call is routed to one of NCA and EA1 and EA2 or an NTC CCIS signal is sent toward the call origination.

In FIG. 8, if the gap time for the INWATS code has expired, a software clock register is consulted to see if the fixed CC time of five minutes has expired since its last refreshment. If the fixed time has expired, the INWATS code is marked as inactive in the CC controls. If the fixed time has not expired, the present clock time PCT is placed in the CG control as the new last clock time LCT for the code. In either case, thereafter the flow chart returns from FIG. 8 to FIG. 6 by way of path J.

It will be seen that code control (CC), as depicted in the flow chart of FIG. 8, uses code gapping (CG) according to the invention so long as the fixed CC time has not expired.

It is to be understood that the above-described arrangements are illustrative of the application of the principles of the invention. Other arrangements may be devised by those skilled in the art without departing from the spirit and scope of the invention. For example, while the best mode for carrying out the invention is contemplated as a method performed by stored program controlled switching systems according to a suitable sequence of stored program instructions, it is apparent that the method of the invention may be employed in any other desired type of switching system. Furthermore, while the best mode contemplated for carrying out the method of the invention involves a call to a particular called customer, it is also apparent that any other desired type of call could be traffic controlled according to the invention. In addition, while the invention has been illustrated herein as involving a called customer code as the prescribing parameter of the call according to the best mode contemplated, it is apparent that any other desired parameter may be used since many types of calls involve many well-known different call parameters such, for example, as class of call, calling origin, type of call service required, and so forth, it also being apparent that those examples represent far from an exhaustive list. Also, while an entire called customer code has been used herein by way of example as the prescribing parameter, it is apparent that some part of such a code may be used rather than the entire code. The latter is apparent in view of well-known switching systems wherein any number of digits from one to all of a code may be used for control purposes.

I claim:

1. A method of controlling call traffic in a communication switching system wherein attempts are made to complete at least parts of communication paths for calls CHARACTERIZED BY limiting the recurrence rate of successive attempts for a particular type of call to a maximum rate prescribed by a parameter of the particular type of call.

2. The invention defined in claim 1 further characterized in that
   (a) the particular type of call is a call to a particular called customer,
   (b) the parameters of the call include a called customer code, and
   (c) the prescribing parameter is at least part of the called customer code.

3. The invention defined in claim 2 further characterized in that
   (a) the called customer code comprises identification of the particular called customer and
   (b) the prescribing parameter is the identification of the particular called customer.

4. The invention defined in claim 3 further characterized in that
   (a) the particular called customer has assigned thereto at least one particular communication switching center terminal and
   (b) the identification of the particular called customer is exclusive of the identification of any particular communication switching center terminal assigned thereto.

5. The invention defined in claim 3 further characterized in that
   (a) the particular called customer has assigned thereto at least one particular communication switching center terminal and
   (b) the identification of the particular called customer comprises identification of a particular communication switching center terminal assigned thereto.

6. The invention defined in claim 5 further characterized in that
   (a) the identification of the particular assigned terminal comprises
      (1) a first identity of a particular center wherein the assigned terminal is located and
      (2) a second identity of the assigned terminal in the particular center; and,
   (b) the prescribing parameter is at least one of the first and second identities.

7. The invention defined in claim 6 further characterized in that
   (a) the first identity comprises
      (1) an area identity of a particular geographical area wherein the particular center is located and
      a center identity of the particular center in the particular area;
   (b) the second identity comprises a specific terminal identity in the particular center; and,
   (c) the prescribing parameter is at least one of the area and center and specific terminal identities.

8. The invention defined in claim 1, 2, 3, 4, 5, 6 or 7 further characterized in that the limiting step comprises
   (a) allocating to the prescribing parameter a minimum time interval between the allowable making of the successive attempts,
   (b) presently ascertaining whether or not at least the minimum interval has elapsed since the last earlier attempt was allowed to be made, and (c) allowing a present attempt to be made only if at least the minimum interval has elasped.

9. The invention defined in claim 8 further characterized in that the ascertaining step comprises
 (a) recording the earlier clock time when the last earlier attempt was allowed to be made and
 (b) verifying whether or not the difference between the present clock time and the recorded earlier clock time is at least equal to the minimum interval.

10. The invention defined in claim 9 further characterized in that the verifying step comprises
 (a) adding the minimum interval to the recorded earlier clock time and
 (b) comparing the sum of the addition to the present clock time.

11. The invention defined in claim 10 further characterized in that the allowing step comprises changing the recorded earlier clock time so that it is equal to the present clock time.

* * * * *